US010493711B2

(12) United States Patent
Fortner et al.

(10) Patent No.: US 10,493,711 B2
(45) Date of Patent: Dec. 3, 2019

(54) SYSTEM FOR CONTINUOUS TIRE TREAD EXTRUSION, MOLDING, AND CURING

(71) Applicants: Compagnie Generale des Etablissements Michelin, Clermont-Ferrand (FR); Michelin Recherche et Technique S.A., Granges-Paccot (CH)

(72) Inventors: James Fortner, Greenville, SC (US); Chinglin Pan, Greenville, SC (US); John Hommerson, Greenville, SC (US); David Lung, Greenville, SC (US); Michael Petrovich, Greenville, SC (US); Chris Beccavin, Greenville, SC (US)

(73) Assignees: Companie Generale Des Etablissements Michelin, Clermont-Ferrand (FR); Michelin Recherce Et Techinque S.A., Granges-Paccot (CH)

(*) Notice: Subject to any disclaimer, the term of this patent is extended or adjusted under 35 U.S.C. 154(b) by 316 days.

(21) Appl. No.: 15/512,888

(22) PCT Filed: Oct. 23, 2014

(86) PCT No.: PCT/US2014/061903
§ 371 (c)(1),
(2) Date: Mar. 21, 2017

(87) PCT Pub. No.: WO2016/064394
PCT Pub. Date: Apr. 28, 2016

(65) Prior Publication Data
US 2017/0246822 A1    Aug. 31, 2017

(51) Int. Cl.
*B29C 43/26*     (2006.01)
*B29D 30/52*    (2006.01)
(Continued)

(52) U.S. Cl.
CPC .......... *B29D 30/52* (2013.01); *B29C 48/0011* (2019.02); *B29C 48/07* (2019.02);
(Continued)

(58) Field of Classification Search
CPC ..... B29D 30/52; B29C 48/0011; B29C 48/07; B29C 33/34; B29C 37/0003;
(Continued)

(56) References Cited

U.S. PATENT DOCUMENTS

| 2,288,611 | A | * | 7/1942 | De Wyk | B30B 11/00 |
| | | | | | 198/850 |
| 2,533,335 | A | * | 12/1950 | Wallace | B29C 33/36 |
| | | | | | 198/626.2 |

(Continued)

FOREIGN PATENT DOCUMENTS

| GB | 1356857 | 6/1974 |
| GB | 2087298 A | 5/1982 |
| JP | 2014058046 | 4/2014 |

OTHER PUBLICATIONS

International Search Report for PCT/US2014/061903, dated Feb. 5, 2015.
(Continued)

*Primary Examiner* — James P Mackey
(74) *Attorney, Agent, or Firm* — Dority & Manning, P.A.

(57) ABSTRACT

A system for the continuous extrusion, molding, and curing of tread rubber is provided. A plurality of discrete mold sectors are arranged adjacent to each other along a longitudinal axis between an in-feed and an out-feed of a mold sector transport mechanism that extends through a heated press. As the mold sectors are continuously advanced along a process direction in steps, rubber material is extruded and placed onto at least one of the mold sectors near the in-feed end such that an elongated strip of rubber material extends
(Continued)

over multiple mold sectors along the longitudinal axis. As the strip of rubber material exits the press, the mold sectors are sequentially removed from the rubber material and returned to the in-feed. An extruder outlet positioned near the in-feed can be moved towards or away from the mold sectors to supply rubber material and prevent backflow.

9 Claims, 13 Drawing Sheets (51) Int. Cl.
    *B29C 48/07* (2019.01)
    *B29C 48/00* (2019.01)
    *B30B 5/04* (2006.01)
    *B30B 11/14* (2006.01)
    *B29C 37/00* (2006.01)
    *B29C 33/34* (2006.01)
    *B29C 43/34* (2006.01)
    *B29K 21/00* (2006.01)
    *B29C 48/06* (2019.01)
    *B29C 48/25* (2019.01)

(52) U.S. Cl.
    CPC ............... *B30B 5/04* (2013.01); *B30B 11/14* (2013.01); *B29C 33/34* (2013.01); *B29C 37/0075* (2013.01); *B29C 43/26* (2013.01); *B29C 48/06* (2019.02); *B29C 48/266* (2019.02); *B29C 2043/3438* (2013.01); *B29K 2021/00* (2013.01)

(58) Field of Classification Search
    CPC ..... B29C 37/0075; B29C 43/22; B29C 43/26; B29C 2043/3433; B29C 2043/3438; B30B 11/14
    See application file for complete search history.

(56) References Cited

U.S. PATENT DOCUMENTS

| | | |
|---|---|---|
| 3,594,866 A | 7/1971 | Skinner |
| 3,827,846 A | 8/1974 | Weiler |
| 4,128,369 A | 12/1978 | Kemerer |
| 4,230,649 A | 10/1980 | Bohm |
| 4,285,654 A | 8/1981 | Bohm |
| 4,808,257 A | 2/1989 | Rex |
| 4,818,203 A * | 4/1989 | Majerus .............. B29C 45/0003 156/125 |
| 5,342,462 A | 8/1994 | King |
| 5,458,477 A | 10/1995 | Kemerer |
| 6,187,252 B1 | 2/2001 | Rhoades |
| 6,790,301 B2 | 9/2004 | Risser |
| 2003/0041950 A1 | 3/2003 | Wellman |
| 2003/0070742 A1 | 4/2003 | Risser |
| 2014/0060730 A1 | 3/2014 | Pan |

OTHER PUBLICATIONS

International Search Report for PCT/US2016/28216 dated Jul. 21, 2016.
International Search Report for PCT/US2015/32918 dated Aug. 25, 2015.
International Search Report for PCT/US2015/032911 dated Aug. 14, 2015.
Extended European Search Report, PCT/US2016/028218 dated Dec. 17, 2018.

* cited by examiner

SYSTEM FOR CONTINUOUS TIRE TREAD EXTRUSION, MOLDING, AND CURING

FIELD OF THE INVENTION

The subject matter of the present disclosure relates generally to a system for continuously extruding, molding, and curing tread for tires.

BACKGROUND OF THE INVENTION

Conventional methods for the manufacture of tire tread include a multiple step, non-continuous process. Typically, a rubber strip having a desired cross-sectional profile is extruded from a rubber-based formulation that is referred to herein as rubber or a rubber material. The rubber material typically includes a variety of components such as functional elastomers, resins, carbon black fillers, non-carbon black fillers, and/or other substances. As part of the extrusion process, the rubber is heated and fluidized. Pressure from the extruder screw forces the rubber through a die on the extruder outlet that imparts the desired profile to the rubber strip. For example, the strip may be flat, have tapered sides, and include one or more ribs extending along its length. The extruded rubber strip is then wound and stored. Heat energy from extrusion process is usually lost as the rubber cools during the subsequent handling and storage.

In order to apply a tread pattern, the rubber strip is unwound, cut to length, and positioned as separate pieces into a mold. Placement of each strip onto the mold requires carefully positioning each piece into the mold individually. Such placement may be performed in a manually intensive process that requires movement of the relatively heavy rubber strips. As part of the molding process, each rubber strip is reheated in the mold in order to cure the rubber and facilitate the molding of tread features into the rubber strip.

The resulting strips of tread rubber are then removed from the mold. Again, this may be performed manually. Each strip of tread rubber may then be stored again until it is applied to a tire carcass. Joining the tread strip with the tire carcass can require additional heating for completing the curing process and affixing the tire to the carcass.

Such conventional, non-continuous processing for creating the tread is inefficient. The loss of heat energy after extrusion means additional energy expense must be incurred in order to reheat the rubber for subsequent molding and curing. The storage and handling of the rubber in between extrusion and molding adds additional expense in the form of labor and space. Additionally, heating the same rubber strip multiple times requires careful temperature control over specific time periods in order to ensure the proper overall amount of curing is achieved.

Accordingly, a system for the extrusion, molding, and curing of rubber to manufacture tread for tires would be useful. A system that can reduce or eliminate storage and reheating of the rubber between extrusion and molding would be beneficial. Such a system that can perform these operations continuously would be particularly useful.

SUMMARY OF THE INVENTION

The present invention provides a system for the continuous extrusion, molding, and curing of tread rubber. A plurality of discrete mold sectors are arranged adjacent to each other along a longitudinal axis between an in-feed and an out-feed of a mold sector transport mechanism that extends through a heated press. As the mold sectors are continuously advanced along a process direction in steps, rubber material is extruded and placed onto at least one of the mold sectors near the in-feed end such that an elongated strip of rubber material extends over multiple mold sectors along the longitudinal axis. The press is used to apply heat and pressure to the elongated strip by pressing the mold sectors between multiple platens in between steps of advancing the mold sectors. As the strip of rubber material exits the press, the mold sectors are sequentially removed from the rubber material and returned to the in-feed. An extruder outlet positioned near the in-feed can be moved towards or away from the mold sectors to supply rubber material and prevent backflow from the mold sectors.

By transferring rubber material directly from the extruder to the mold sectors in a continuous process, the present invention provides for substantial improvements in efficiency by e.g., reducing the overall heat energy required for molding and curing the tread and eliminating the storage of extruded rubber material before molding. The present invention is also advantageous in allowing the same apparatus to be used with different rubber materials to make different treads with minimal set-up adjustments. More accurate control of the amount of time over which the rubber material is placed under pressure in the molding process can also be achieved. Additional objects and advantages of the invention will be set forth in part in the following description, or may be apparent from the description, or may be learned through practice of the invention.

In one exemplary aspect, the present invention provides a method for continuous molding and curing of a tire tread using a plurality of mold sectors arranged adjacent to each other along a longitudinal axis. The mold sectors are positioned on a first lower platen and on an adjacent second lower platen. The method includes the steps of pressing an elongated strip of rubber material between the mold sectors and one or more upper platens, the strip of rubber material extending in a continuous manner over the mold sectors; lowering the mold sectors by lowering both the first lower platen and the second lower platen; advancing the mold sectors and the strip of rubber material along a process direction so as to shift all mold sectors on the first lower platen and second lower platen away from the first lower platen; lowering the first lower platen to a vertical position that is lower than the second mold platen; extruding additional rubber material in the process direction over the first lower platen, the additional rubber material in continuous connection with the elongated strip of rubber material; positioning a mold sector onto the first lower platen; lifting the first lower platen and the second lower platen; and repeating the previous steps with the strip of rubber material and the connected additional rubber material.

In another exemplary embodiment, the present invention provides an apparatus for the continuous molding and curing of a tire tread. The apparatus defines a longitudinal axis. The apparatus includes an extruder with an outlet for providing an extruded rubber material flow onto a plurality of movable mold sectors. A mold sector transport mechanism is arranged along the longitudinal axis and is configured for moving mold sectors along a process direction. The mold sector transport mechanism has an in-feed end and an out-feed end. One or more upper platens are positioned over the mold sector transport mechanism.

A first lower platen is positioned near the in-feed end of the mold sector transport mechanism. The first lower platen is movable along a vertical direction relative to the one or more upper platens. A second lower platen is positioned adjacent and downstream of the first lower platen. The second lower platen is movable along a vertical direction relative to the one or more upper platens. A first hydraulic motor is configured for raising and lowering the first lower platen. A second hydraulic motor is configured for raising and lowering the second lower platen.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
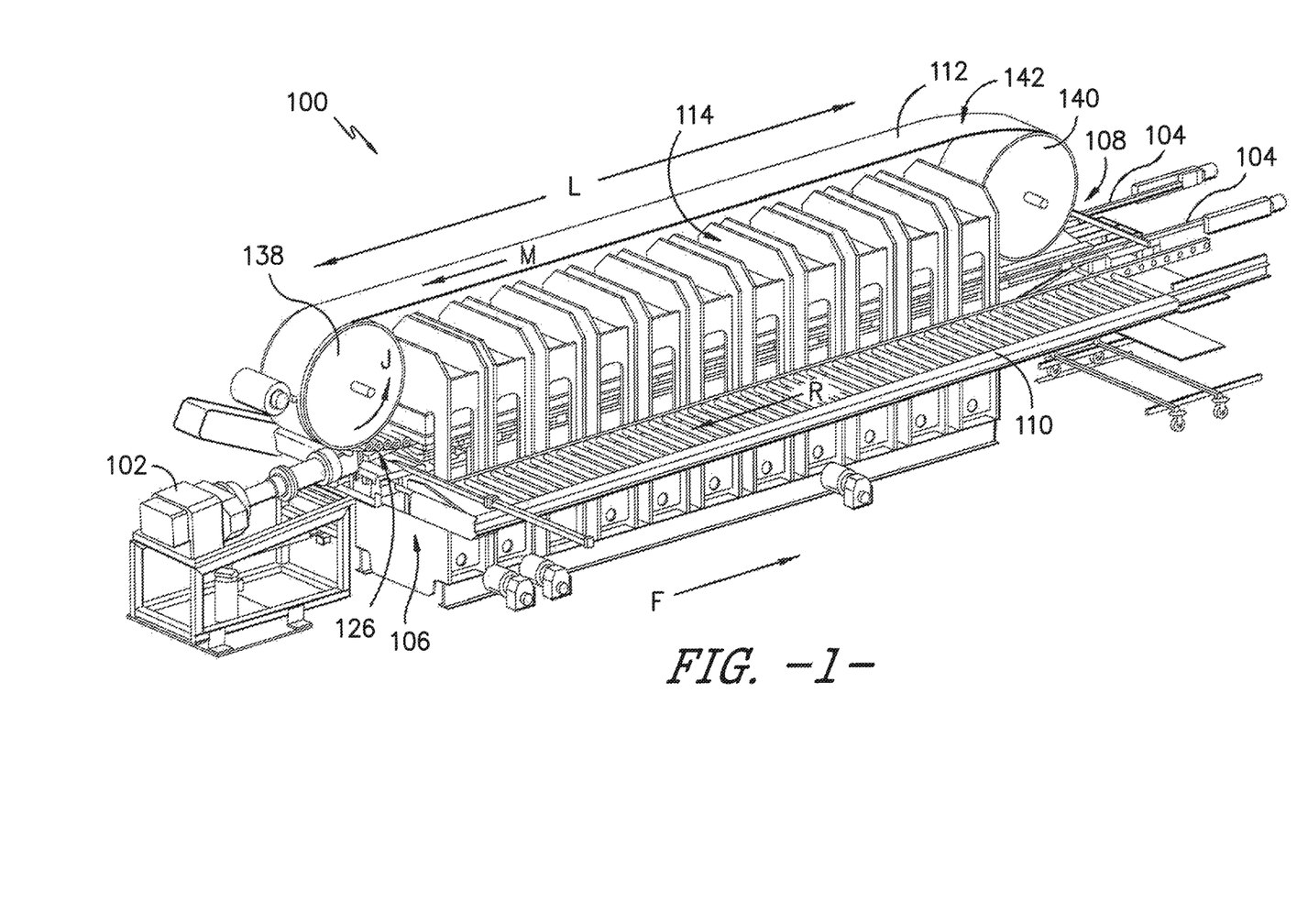
FIG. 1 illustrates a perspective view of an exemplary embodiment of an apparatus for the continuous extrusion, molding, and curing of tire tread.
Figure 2:
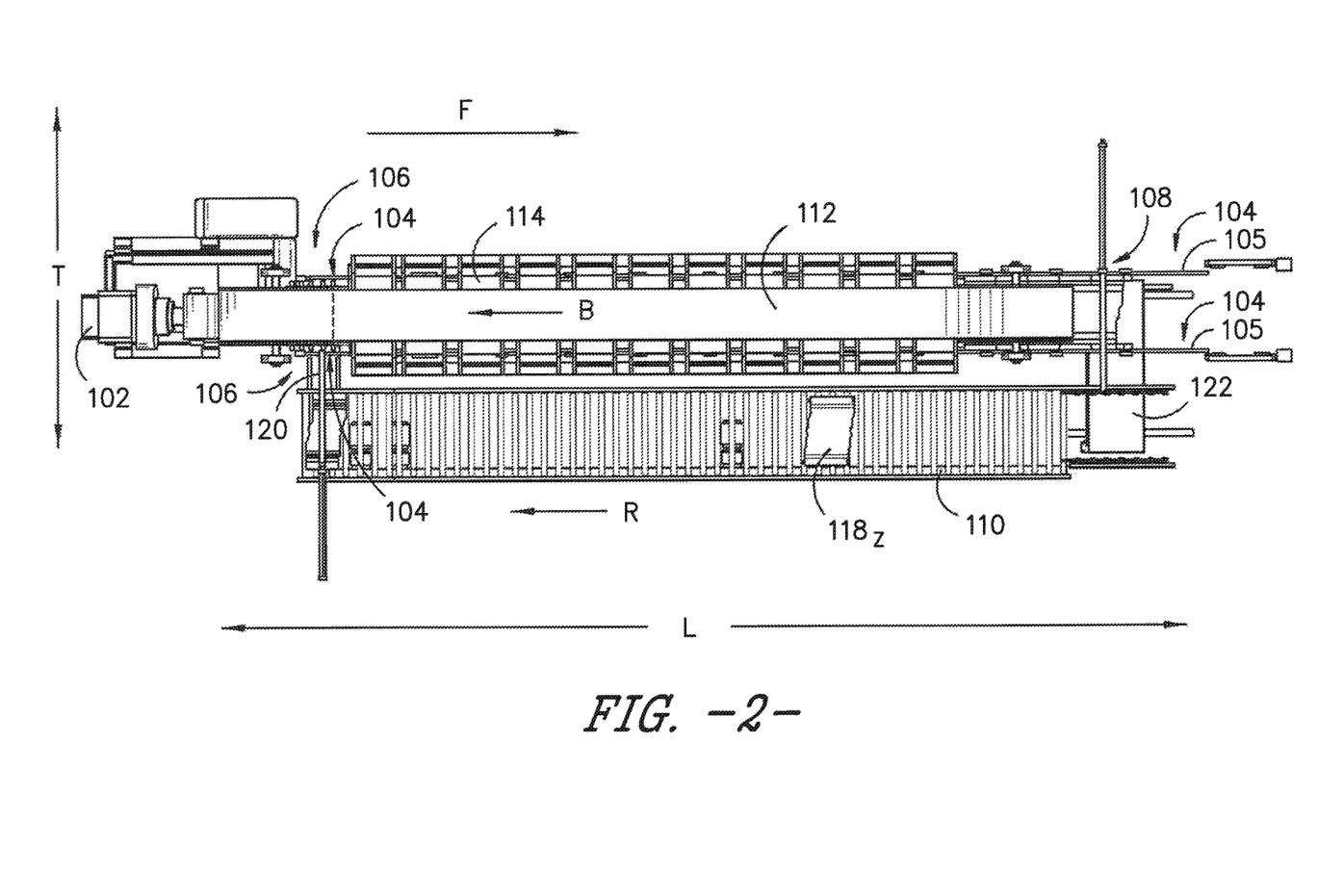
FIG. 2 illustrates a top view of the exemplary apparatus of FIG. 1.

An exemplary apparatus 100 for the continuous extrusion, molding, and curing of tread is illustrated in the perspective and top views of FIGS. 1 and 2, respectively. Apparatus 100 includes several mechanisms, the description and operation of which will be further set forth herein. For purposes of describing the invention, reference now will be made in detail to exemplary apparatus 100, one or more examples of which are illustrated in the drawings. Apparatus 100 is provided by way of explanation of the invention, not limitation of the invention, and will also be used to describe exemplary methods of the present invention. It will be apparent to those skilled in the art that various modifications and variations can be made in the exemplary methods and apparatus of the present invention without departing from the scope or spirit of the invention. For instance, features illustrated or described as part of one embodiment such as apparatus 100, can be used with another embodiment to yield a still further embodiment. Thus, it is intended that the present invention covers such modifications and variations as come within the scope of the appended claims and their equivalents.

Referring to FIGS. 1 and 2, exemplary apparatus 100 includes an extruder or extrusion machine 102 positioned near an in-feed end 106 of a mold sector transport mechanism 104. Extruder 102 receives rubber material and uses a rotating screw to mix and masticate the materials under elevated pressures and temperatures. One advantage of the present invention is that a variety of different rubber materials may be extruded and molded using the same apparatus 100 to provide a variety of treads. The processed rubber material exits extruder 102 as a continuous, elongated strip of rubber material through extruder outlet 126, which may include a die that imparts an overall shape or profile to the extruded rubber strip. Extruder 102 and/or extruder outlet 126 are movable back and forth along longitudinal axis L between first and second positions as will be further described.

The strip of rubber material (or rubber strip) is transported on, and molded by, mold sectors 146 of discrete mold units 118 (FIG. 3) that are releasably linked together in an adjacent manner along mold unit transport mechanism 104. The rubber strip extends continuously over multiple mold units 118 as such are moved along process direction F by a mold sector transport mechanism 104. As used herein, process direction F represents the overall movement of the strip of rubber material as it is processed by apparatus 100. Process direction F is parallel to the longitudinal axis L defined by the length of apparatus 100. Mold sector transport mechanism 104 extends longitudinally between an in-feed end 106 and an out-feed end 108.

Mold sector transport mechanism 104 include e.g., motorized rails 105 to provide for the movement of mold units 118 along the process direction F. Alternatively, a conveyor system using rollers or an endless belt could be used to transport mold units 118. As such, mold units 118 may be pushed, pulled, and/or conveyed along process direction F. Other constructions for mold sector transport mechanism 104 may be used as well.

Mold units 118 are moved through a press 114 while the elongated rubber strip is heated and molded as it moves along process direction F. Near out-feed end 108, the rubber strip is demolded—i.e. tread mold units 118 are individually removed from the rubber strip onto which the tread features have been molded by mold sectors 146. Tread mold units 118 are then transferred along lateral direction T (orthogonal to longitudinal axis L) from mold sector transport mechanism 104 to mold sector return mechanism 110 by an out-feed end lateral transfer device 122.

By way of example, mold sector return mechanism 110 may have a construction similar to mechanism 104 such as e.g., a motorized conveyor system, rails, and/or a plurality of rollers with one or more devices for transporting mold units 118 along mechanism 110 in the direction of arrow R, which is opposite to process direction F. Other constructions for mechanism 110 may be used as well. Additionally, mold sector return mechanism 110 may include one or more heating devices for heating mold units 118 as such travel on mechanism 110.

Upon travelling the length of mechanism 110 in the direction of arrow R, an in-feed lateral transfer device 120 is used to transfer mold units 118 along lateral direction T. Mold units 118 are transferred from mold sector return mechanism 110 to mold sector transport mechanism 104 near in-feed end 106—where mold units 118 can receive additional rubber material from extruder 102. As such, during operation of apparatus 100, mold unit transport mechanism 104, mold unit return mechanism 110, and transfer devices 120 and 122 form a loop for the continuous movement of mold units 118 for the continuous supply to, and removal from, press 114.

Figure 3:
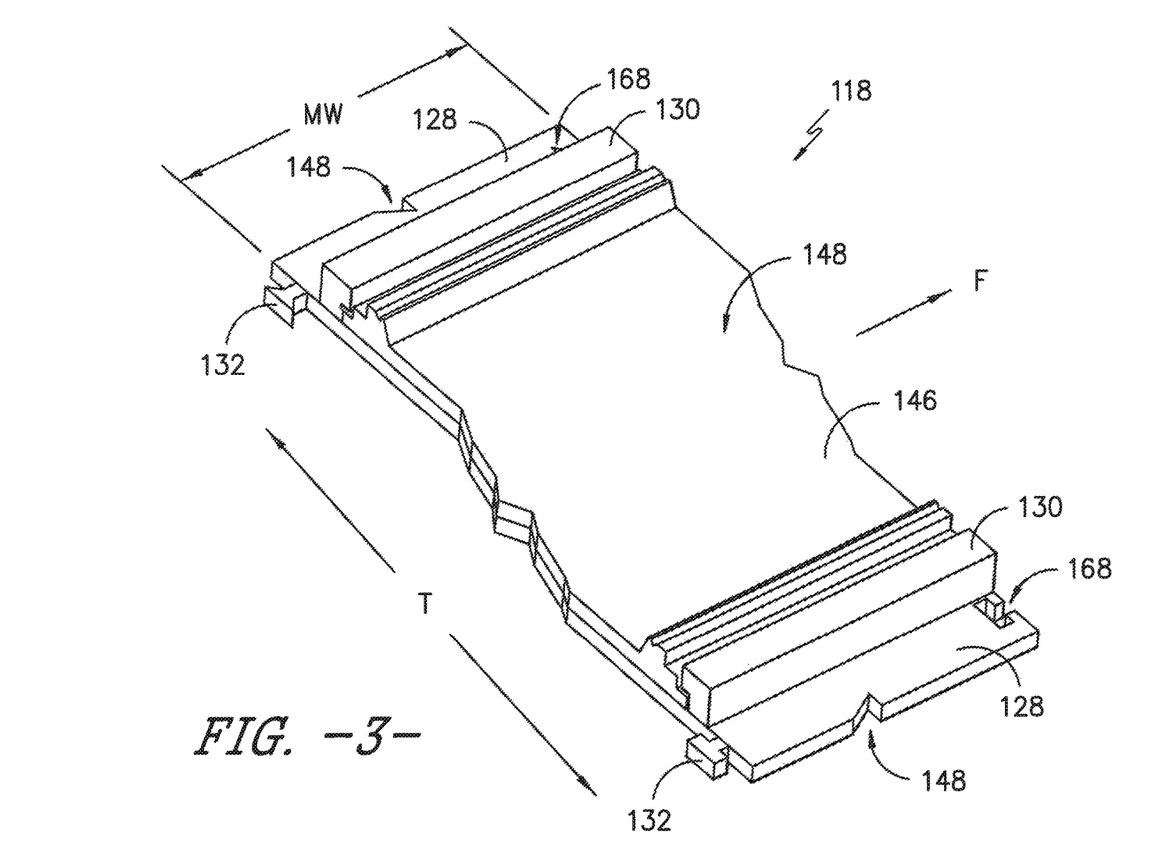
FIG. 3 is a perspective view of an exemplary mold unit of the present invention including an exemplary mold sector.
Figure 5:
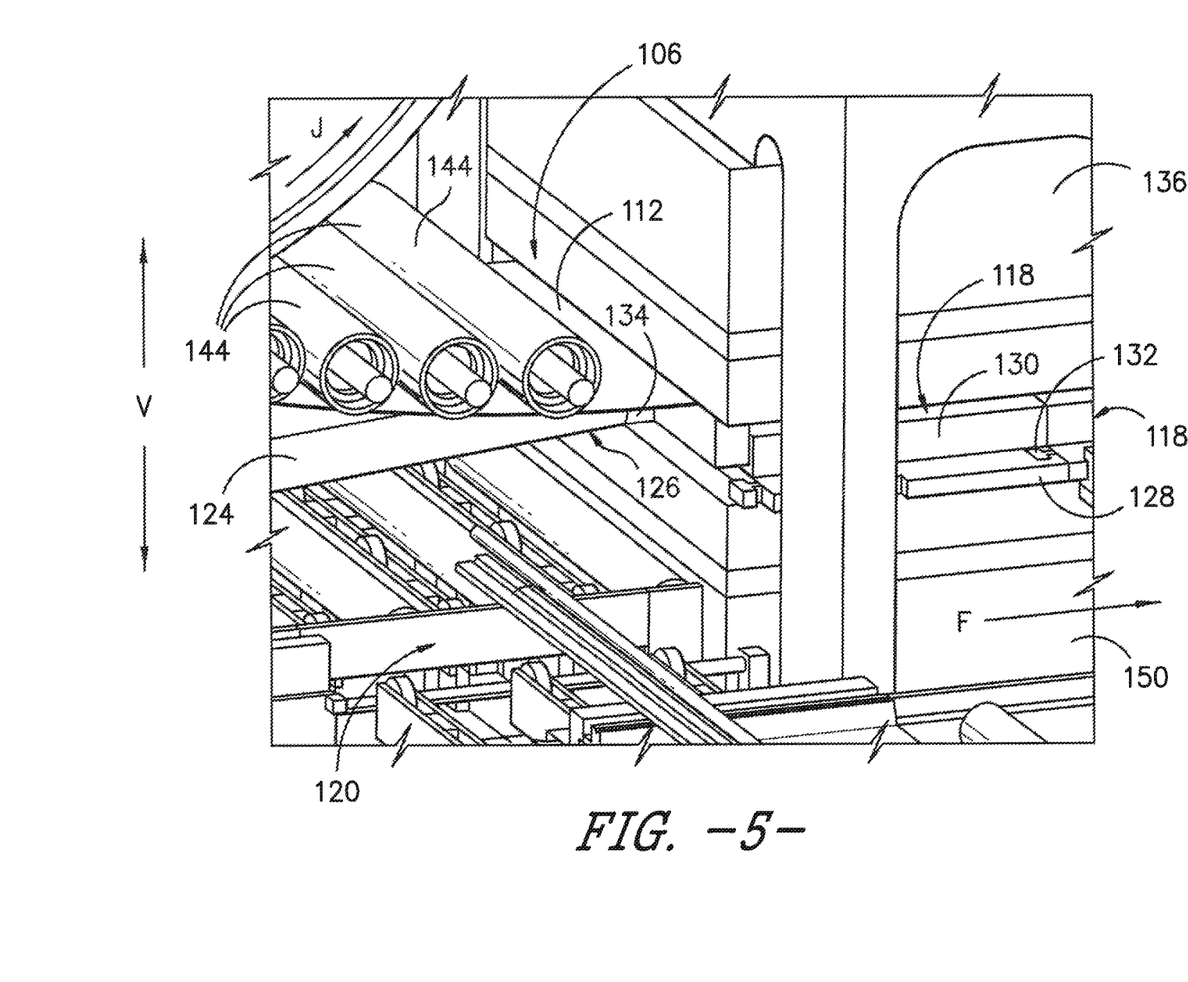
FIG. 5 is a close-up, perspective view of the in-feed end of the exemplary apparatus of FIG. 1.

FIG. 3 provides a partial perspective view of a mold unit 118. For this exemplary embodiment, mold units 118 each include a mold sector 146 positioned between laterally opposing mold support rails 130. The extruded strip of rubber material is received onto the mold surface 148 of multiple adjacent mold units 118 along longitudinal axis L of apparatus 100. Although not shown, mold surface 148 includes features for molding a tread pattern into the rubber material. Mold sector 146 and support rails 130 are each connected to mold back 128. Adjacent mold backs 128 can be selectively locked and unlocked from each other using one or more tongues 132 that mate in complimentary fashion with grooves 168 (FIGS. 3 and 5). Other mechanisms may be used as well.

Accordingly, interlocked mold units 118 move together as they are advanced by mold sector transport system 104 along process direction F. For this exemplary embodiment of mold units 118, mold backs 128 are provided with a pair of opposing notches 148 that are used by the mold sector transport system 104 to pull mold units 118 along process direction F. The construction for mold unit 118 is provided by way of example only as other constructions may be used as well. For example, mold unit 118 may be constructed as an integral element with or without backs 128 and rails 130.

Figure 4:
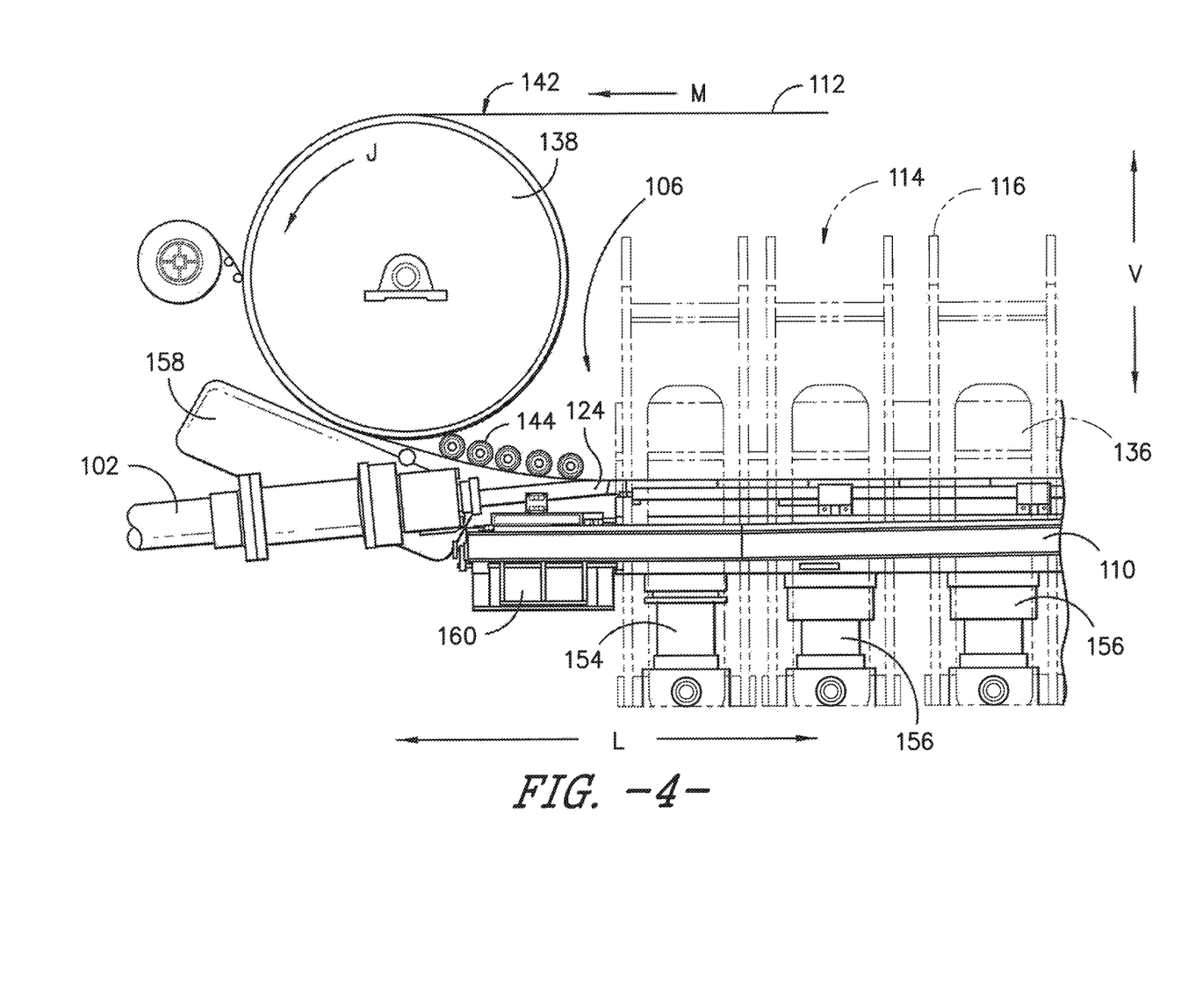
FIG. 4 provides a side view of the exemplary apparatus of FIG. 1 near the in-feed end.

FIG. 4 provides a partial side view of apparatus 100 near in-feed end 106 while FIG. 5 provides a partial perspective, close-up view near in-feed 106. Extruder 102 includes a nozzle 124 with an extruder outlet 126 through which the elongated strip of rubber material is extruded. FIGS. 4 and 5 depict extruder outlet 126 in a first position where it urges a seal 134 against mold unit 118 to prevent rubber material from back flowing from mold units 118 when a pressure is applied in press 114 as further described below.

Press 114 includes an upper platen 136. In this exemplary embodiment, upper platen 136 is shown as a single, non-movable element extending along longitudinal axis L. However, in other embodiments, upper platen 136 could be constructed as one or more upper platens and such platens could be movable. The upper platen 136 provides a surface against which the elongated strip of rubber material is pressed between platen 136 and mold sectors 146 of mold units 118 during the curing and molding process.

In order to protect upper platen 136, an endless belt 112 extends through press 114 along longitudinal axis L between upper platen 136 and the rubber strip in mold units 118. Endless belt 112 returns over the top of press 114 (FIGS. 1 and 2). Rollers 138 and 140 are used to advance belt 112 along process direction F with the movement of the elongated rubber strip and mold units 118. Rollers 138 and 140 are rotated in the direction of arrow J, and belt 112 returns along the top in the direction of arrow M. A plurality of stepped rollers 144 are used to control the entry of endless belt 112 at in-feed 106. Endless belt 112 may be constructed of e.g., steel mesh with an anti-stick fabric placed on contact side 142 to retard the elongated rubber strip from sticking to upper platen 136. For some rubber formulations, upper platen 136 may need to be cleaned even with use of the anti-stick fabric if rubber material passes through.

Figure 6:
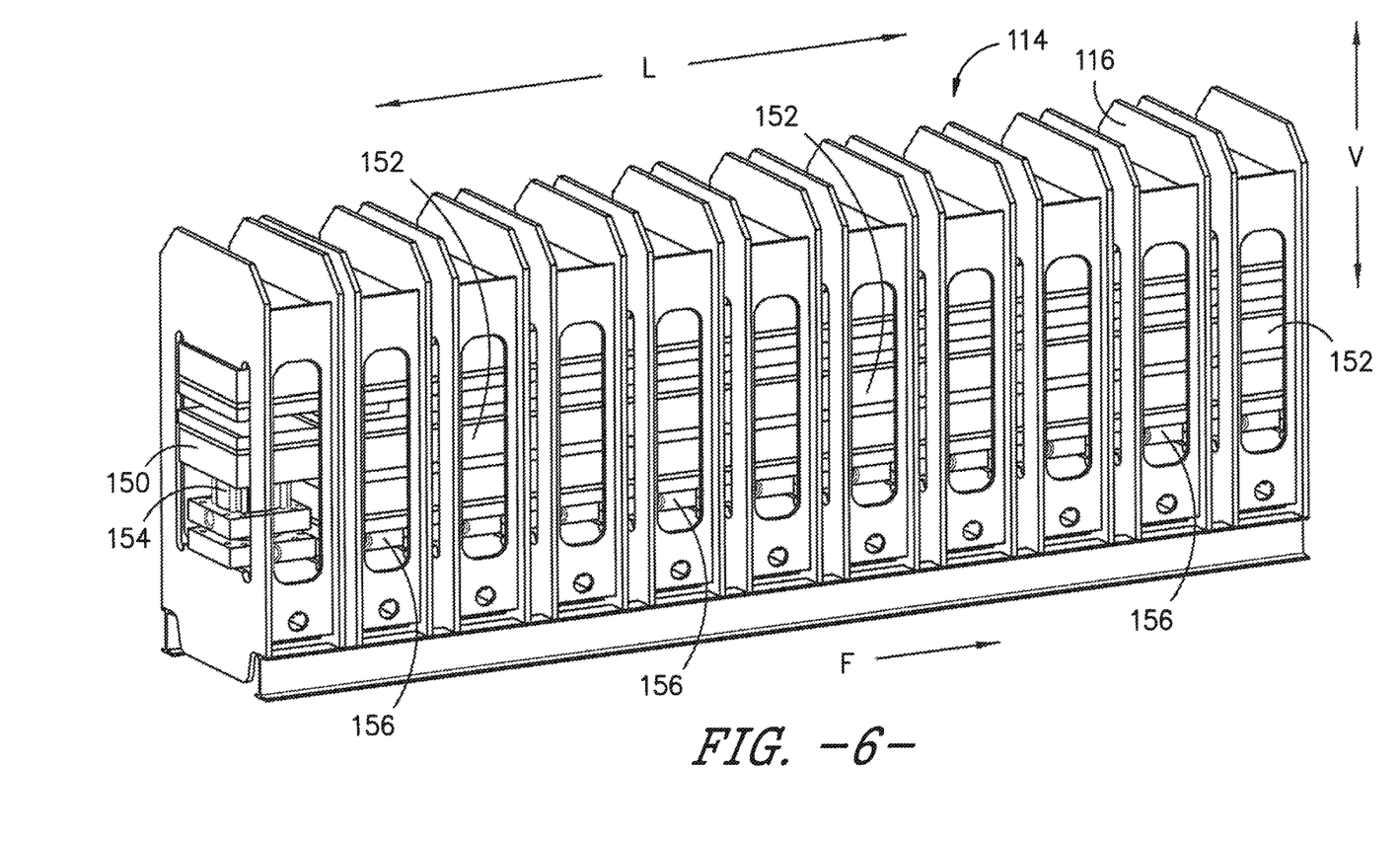
FIG. 6 is a perspective view of an exemplary press that forms part of the apparatus of FIG. 1.

Referring now to FIGS. 4 and 6, press 114 of apparatus 100 includes a first lower platen 150 and a second lower platen 152. Platens 150 and 152 are used to raise and lower mold units 118 while in press 114 and to selectively apply a pressure to the elongated strip of rubber material by urging it against the upper platen 136. The length of second lower platen 152 along longitudinal axis L is considerably greater than the length of first lower platen 150 in this exemplary embodiment. By way of example, first lower platen 150 could have a length along longitudinal axis L of 0.4 meters while second lower platen has a length of 5 meters. For this particular embodiment, first lower platen 150 is used to raise or lower (referring to vertical direction V) one mold unit 118 at a time as such are advanced one at a time along process direction F. Second lower platen 152 is used to raise and lower multiple mold units 118 as they are advanced along process direction F.

One or more of platens 136, 150, and 152 may also be used to apply heat to the elongated strip of rubber material as it passes through press 114. By way of example, one or more of the platens could be equipped with internal passages for the flow of heat transfer fluid that is heated and pumped through the platens for the transfer of heat energy. Other heating mechanisms for heating the rubber material while in press 114 may be used as well. One advantage of the present invention is that the loss of heat energy from the extruded material is minimized because it passes directly from extruder 102 to press 114. As stated previously, during the extrusion process the rubber material is heated. Accordingly, less heat energy is required to heat the rubber material in press 114 as compared to rubber material that has been allowed to cool before being placed into a tread press. Press 114 is contained within a frame 116 as shown.

One or more motors are used to raise and lower platens 150 and 152. For the exemplary press 114, a first hydraulic motor 154 is used to raise and lower first lower platen 150, and a plurality of second hydraulic motors 156 (e.g., 10) are used to raise and lower second lower platen 152. For example, motors 150 and 156 may be provided as hydraulic cylinders. Other motors and/or configurations may be used as well. The operation of motors 154 and 156 are synchronized with the movement of the strip of rubber material through press 114 as will be further described.

An exemplary method of the invention using exemplary apparatus 100 will now be set forth. Using the teachings disclosed herein, one of skill in the art will understand that the exemplary method may be used with other exemplary apparatuses as well to provide additional exemplary methods.

Turning to FIGS. 7 through 13, portions of press 114 are shown in side views. In order to provide additional clarity in describing the invention, mold unit return mechanism 110, and other features have been removed in FIGS. 7 through 13 so that the operation of other components of press 114 are more clearly revealed.

Figure 7:
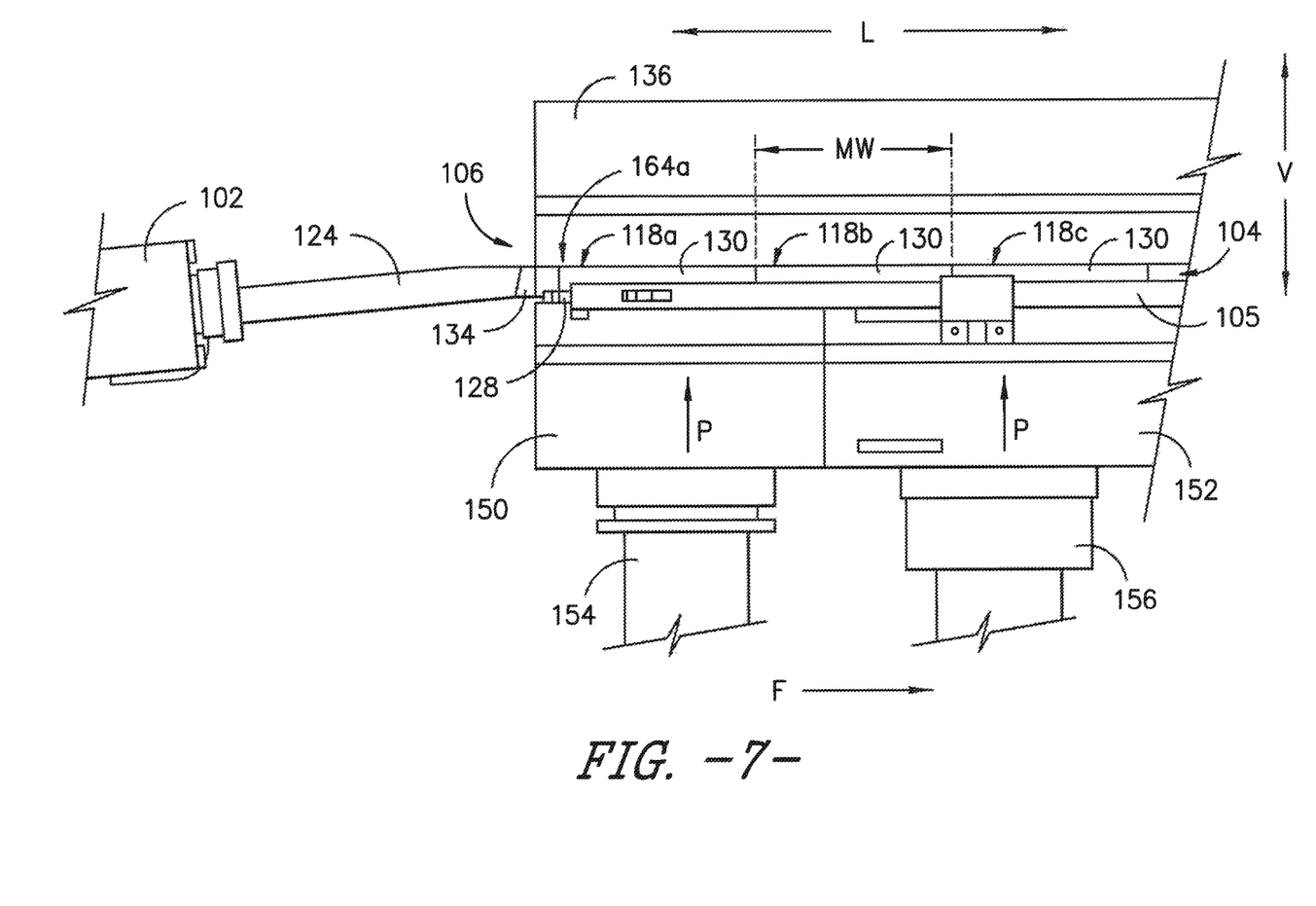
FIGS. 7 through 13 are close-up, side views of the in-feed of the exemplary apparatus of FIG. 1 and illustrate certain steps in an exemplary method of the present invention. As described herein, for FIGS. 7 through 13, some of the elements that appear in the side view of FIG. 4 have been removed to provide additional clarity in describing the invention.

In FIG. 7 (and likewise in FIG. 4), extruder 102 is in a first position where extruder nozzle 124 presses seal 134 against one side 164a of mold unit 118a. First lower platen 150 and second lower platen 152 are pressing mold units 118 (arrows P) so as to press an elongated strip of rubber material between mold units 118 and one or more upper platens 136 to mold and cure the strip. Such pressing is executed by e.g., activating motors 154 and 156.

In order to prevent rubber material from flowing backwards into extruder 102 from mold units 118 during such pressing, extruder 102 is activated so as to apply pressure on the rubber material through nozzle 124 and seal 134 and into mold units 118. This occurs as a motor or other device urges extruder 102 and/or outlet 126 in process direction F towards mold unit 118a so that seal 134 prevents or minimizes the loss of rubber material between extruder nozzle 124 and mold unit 118a. Although not shown in FIGS. 7 through 13, belt 112 with anti-stick material on contact side 142 is positioned between the rubber material on mold units 118 and the one or more upper platens 136 as previously described. In FIG. 7, the strip of rubber material, belt 112, and mold units 118 are stationary—i.e. such are not moving along longitudinal axis L.

Figure 8:
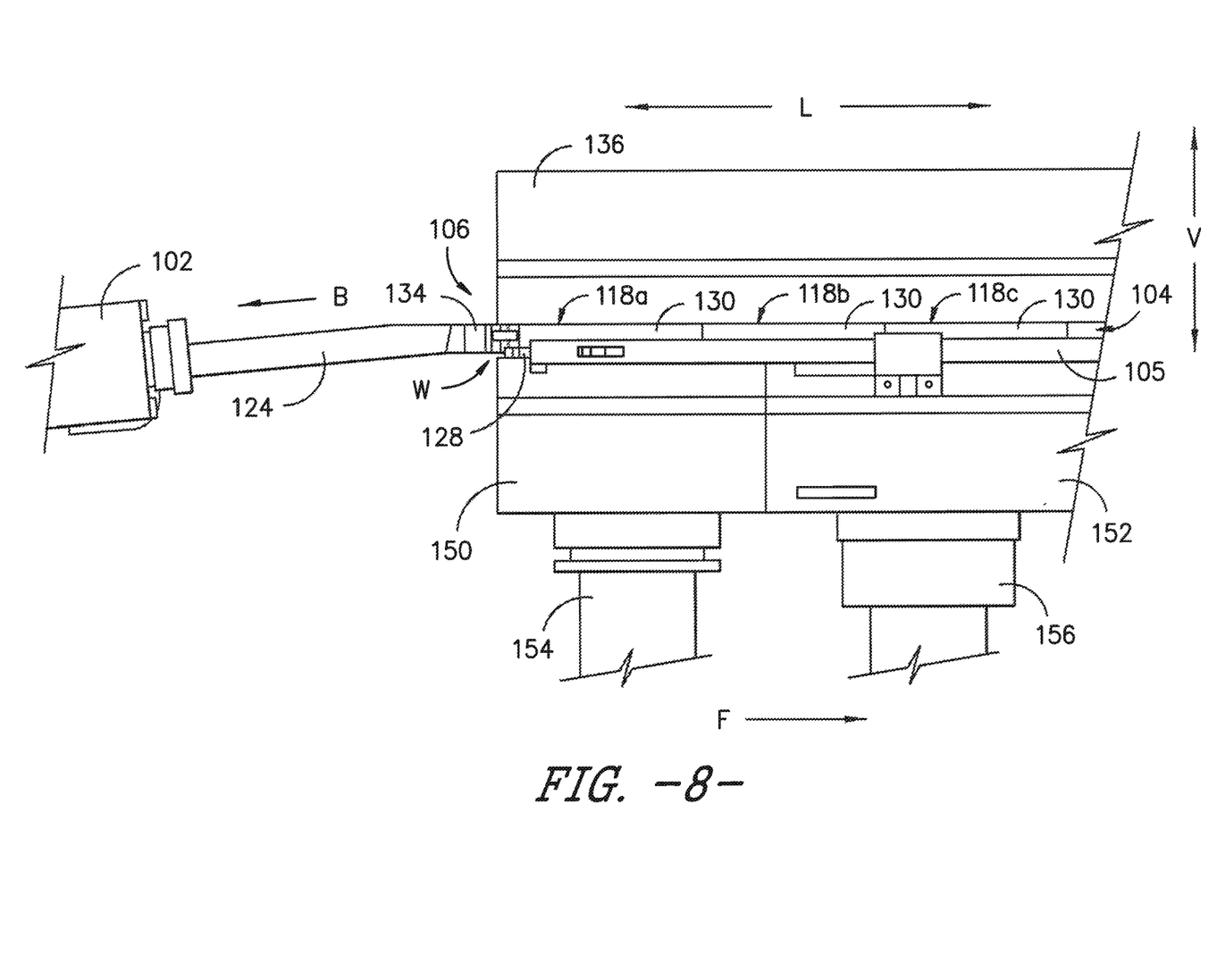

In the next exemplary steps that are described with reference to FIG. 8, extruder 102 is deactivated so as to relieve the pressure it applies to the rubber material in mold units 118 through nozzle 124. For example, a motor turning a screw in extruder 102 may be powered off. Extruder 102 and/or extruder outlet 126 are moved to a second position away from mold units 118 as indicated by arrow B. Such movement creates a gap W between 134 and mold unit 118a. By way of example, gap W may be about 2 mm as measured along longitudinal axis L, but other distances may be used as well. The pressure exerted on the elongated strip of rubber material positioned between mold units 118 and one or more upper platen 136 is also released by deactivating motors 154 and 156 such that platens 150 and 152 no longer exert an upward force (i.e. along vertical direction V towards upper platen 136) against mold units 118 and upper platen 136. The pressure can be released before or during the step when extruder outlet 126 is moved away from mold units 118. In FIG. 8, the strip of rubber material, belt 112, and mold units 118 remain in the same positions as depicted in FIG. 7.

Figure 9:
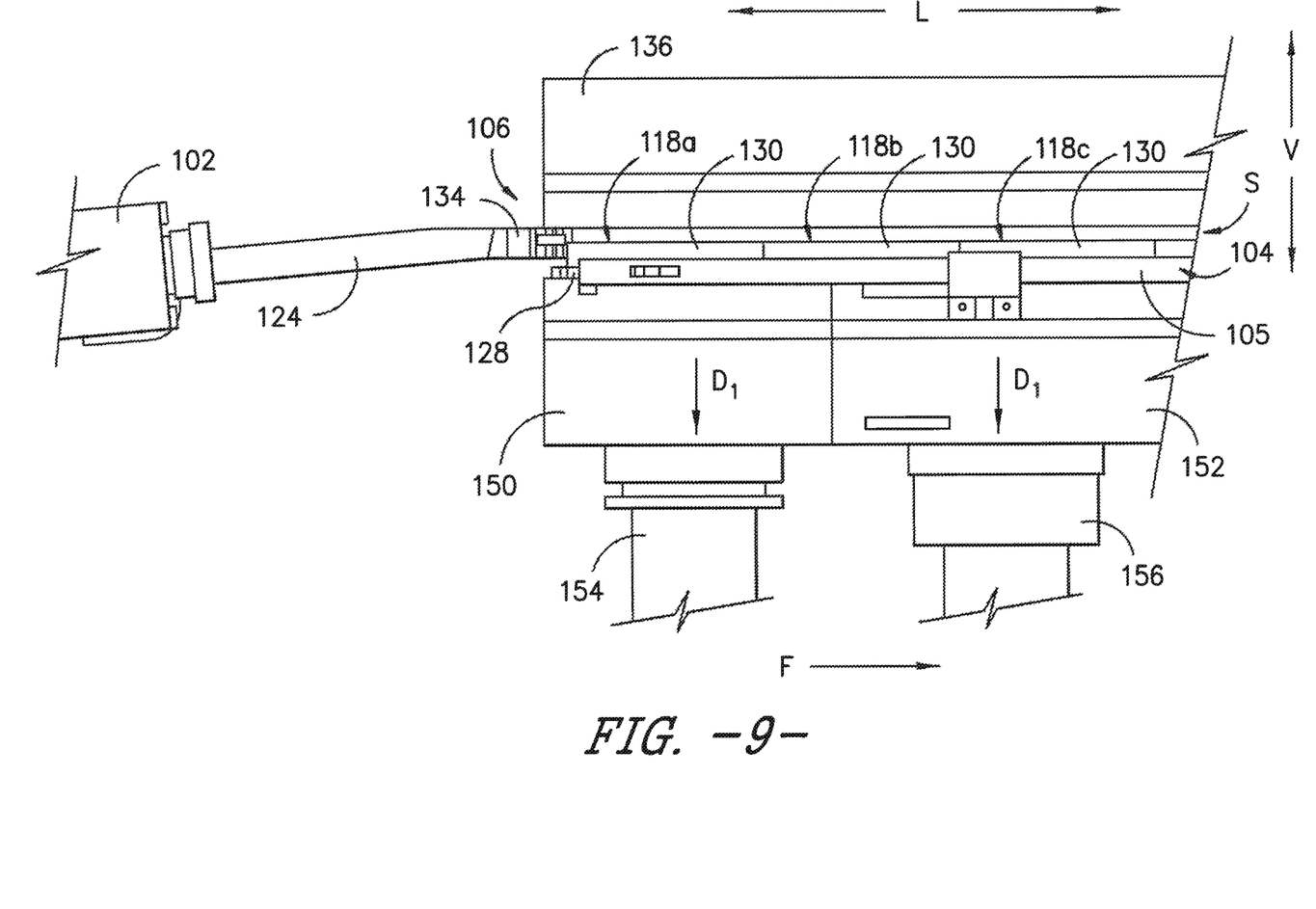

Referring now to FIG. 9, first lower platen 150 and second lower platen 152 are both lowered (i.e. moved along vertical direction V away from upper platen 136) as indicated by arrows $D_1$ in order to e.g., allow the release of various gases from the strip of rubber material on the mold sectors 146 carried by mold units 118. Such movement creates a small gap S between the mold units 118 and one or more upper platens 136. The amount of vertically downward movement may be very small. For example, in one exemplary embodiment, the downward movement is about 3 mm. Other distances may be used as well. In FIG. 9, the strip of rubber material, belt 112, and mold units 118 remain in the same positions as in FIGS. 7 and 8.

Figure 10:
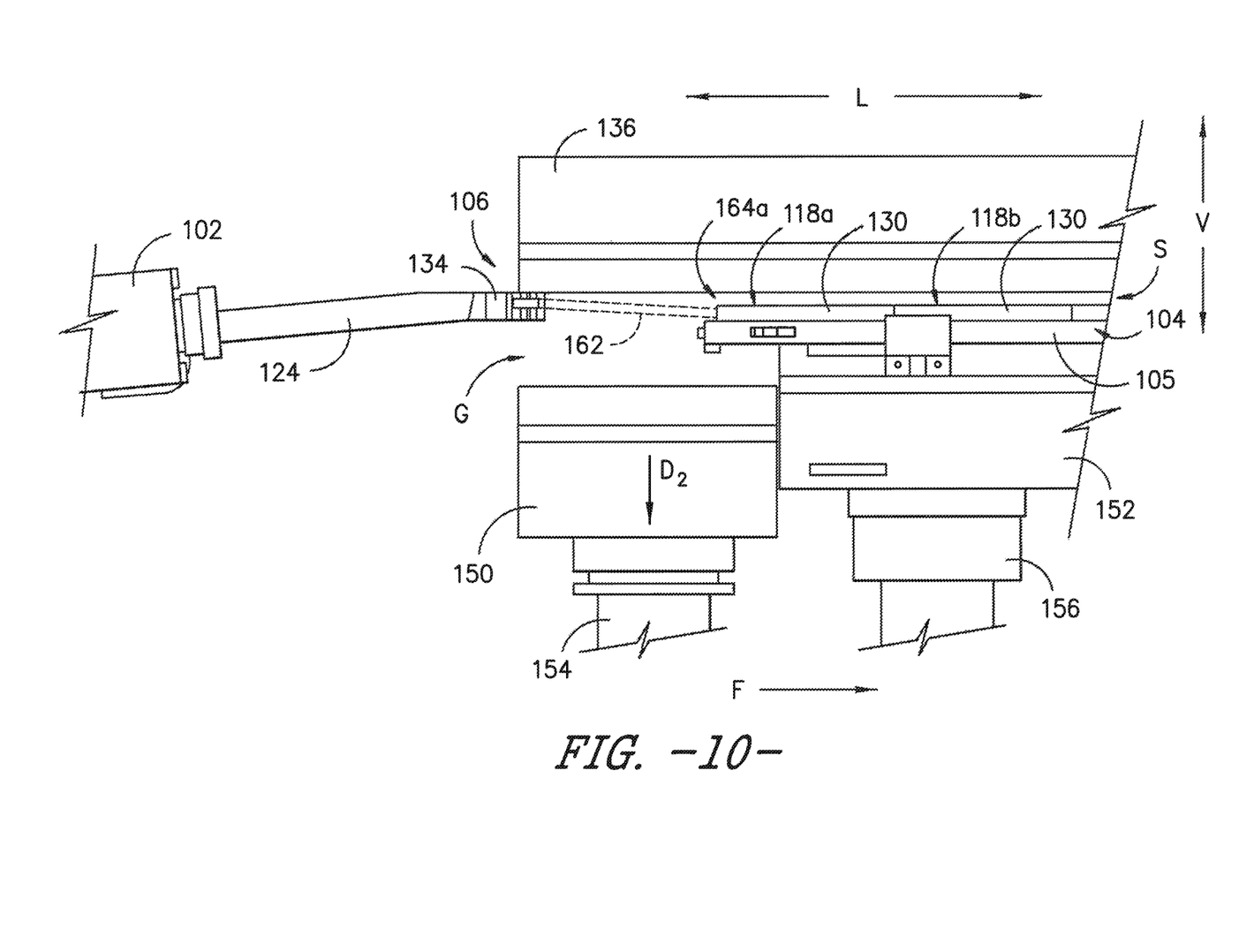

Next, as shown in FIG. 10, mold units 118 are advanced or indexed along process direction F by mold unit transport system 104 such that all mold units 118 on platens 150 and 152 are shifted away from first lower platen 150. The amount of movement along process direction F is the same as the width MW, along longitudinal axis L of a mold sector 146 in mold unit 118 (see FIGS. 3 and 7). Notably, as best seen in FIG. 10, side 164a of mold unit 118 still overlaps or hangs over first lower platen 150. At the same time as mold units 118 are advanced by one width MW, endless sheet 112 is also advanced an amount of width MW along longitudinal axis L by rotating rollers 138 and 140 (arrow J in FIG. 1). Additionally, first lower platen 150 is further lowered (arrow $D_2$) to a position along vertical direction V that is lower than second lower platen 152.

As mold units 118 are advanced, the strip of rubber material moves with mold units 118 along longitudinal axis L by an amount of width MW as well. At the same time, extruder 102 is activated so as to extrude additional rubber material 162 along process direction F and over first lower platen 150. Notably, the additional rubber material 162 remains continuously connected with the strip of rubber material on mold units 118 and with extruder outlet 126. In one exemplary embodiment, the additional rubber material 162 is extruded at a speed along process direction F that matches the speed at which mold units 118 are advanced along process direction F by one mold width MW. This could be accomplished e.g., by synchronizing the speed of rotation of the screw (not shown) in extruder 102 with the speed at which mold units 118 are advanced along process direction F by mold unit transport system 104. A separate mechanism (not shown) may be used to provide support to rubber material as it is extruded for placement onto another mold unit 118.

Before press 114 can be closed to mold the additional rubber material 162, another mold unit 118 must be positioned onto first lower platen 150. Returning now to FIG. 2, as previously stated, at out-feed end 108, the strip of rubber material is de-molded by removing it from mold units 118 one at a time as they exit press 114. FIG. 2 shows a de-molded mold unit 118z returning (arrow R) to in-feed end 106 along mold unit return mechanism 104. After reaching in-feed end 106, mold unit 118z is transferred along lateral direction T by in-feed transfer device 120 to a position between extruder 102 and first lower platen 150. Mold unit 118z is then shifted along the longitudinal axis L onto first lower platen 150.

Figure 11:
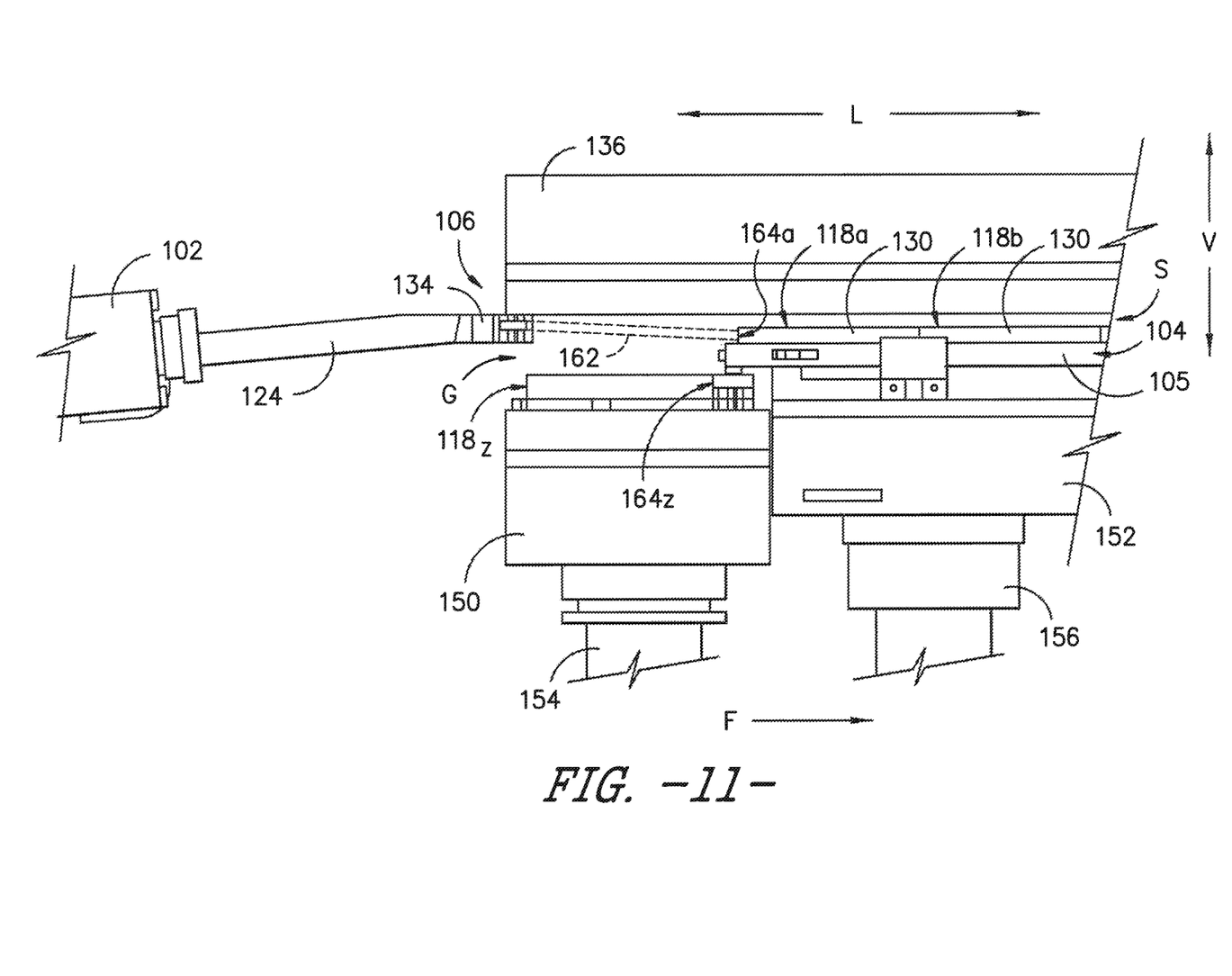

As shown in FIG. 11, first lower platen 150 remains in the same position as shown in FIG. 10 while mold unit 118z is positioned on platen 150. During this step, extruder 102 remains inactive and the other mold units 118 on second lower platen 152 (e.g., 118a, 118, etc.) remain in the same position as in FIG. 10. Endless sheet 112 also maintains its position along longitudinal axis L.

First lower platen 150 is now lifted to the same height along vertical direction V as second lower platen 152. Lower platen 150 is lifted by actuating hydraulic motor 154. Such movement raises mold unit 118z so that its forward side 164z is aligned with the rearward side 164a of mold unit 118a. Such alignment allows a pair of tongues 132 (FIG. 3) on mold unit 118a to be received into a pair of grooves 168 (FIG. 3) on mold unit 118z thereby interlocking units 118z and 118a. Such interlocking allows mold units 118 including units 118a, 118b, 118z to be moved together along longitudinal axis L by mold unit transport mechanism 104.

Figure 12:
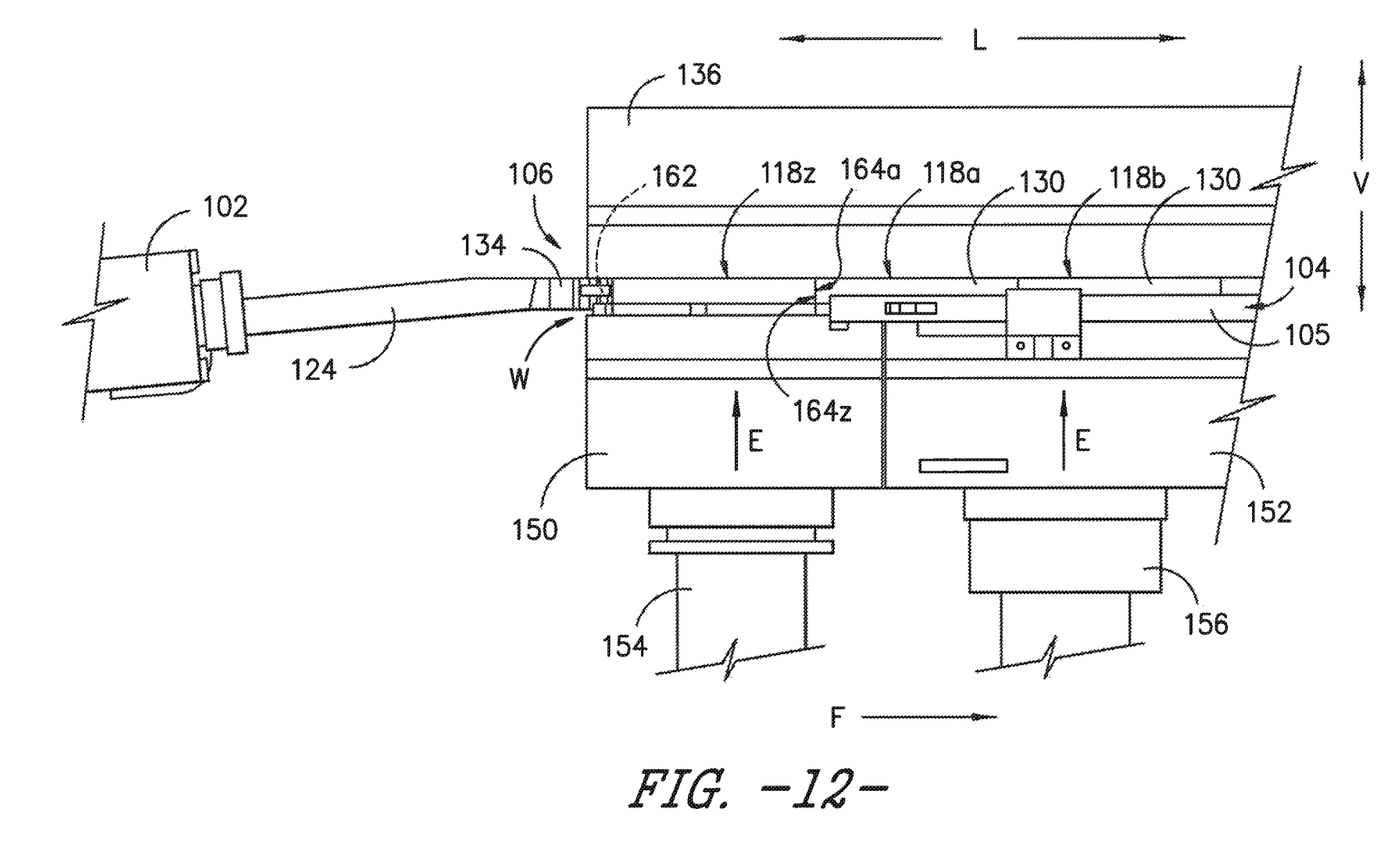

Next, as shown in FIG. 12, first lower platen 150 and second lower platen 152 are both raised simultaneously (arrows E) to close gap S (FIG. 11) and contact mold units 118 against one or more upper platens 136. Hydraulic motors 154 and 156 are both actuated so as to lift platens 150 and 152. Gap W remains between seat 134 and mold 118z as extruder 102 has not yet been moved towards press 114.

Figure 13:
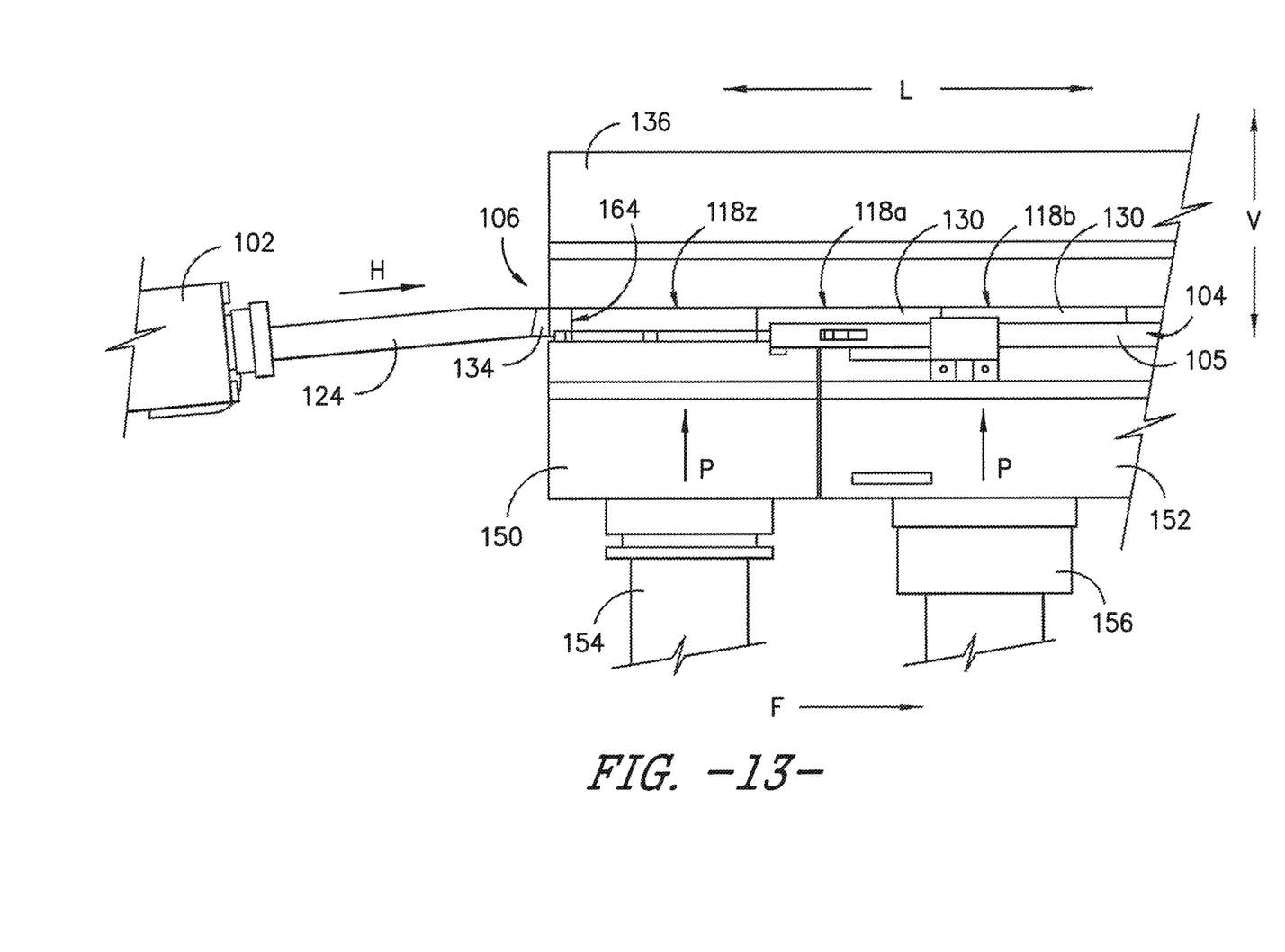

In FIG. 13, extruder 102 and/or extruder outlet 126 are moved (arrow H) back to its first position so that extruder nozzle 124 forces seal 134 against one side 164 of mold unit 118z to prevent the escape of rubber material. Extruder 102 is activated so as to apply pressure to the strip of rubber material (including the additional rubber material 162) between mold units 118 and upper platen(s) 136 to prevent backflow. Hydraulic motors 154 and 156 are both actuated so as to press (arrows P) mold sectors 118 against one or more upper platens 136.

Accordingly, the exemplary steps just described are then repeated beginning with FIG. 7 to provide for the continuous extrusion, molding, and curing of the elongated strip of rubber material. Using the teachings disclosed herein, it will be understood that apparatus 100 operates continuously to advance mold sectors 146 in mold units 118 one at-a-time along process direction F. Each time a mold sector 146 and corresponding mold unit 118 are advanced, extruder 102 is activated to extrude an additional length of rubber material to fill a mold sector 146 returned to the in-feed using mechanism 110. With each such advance of mold units 118, one mold unit 118 is de-molded at out-feed end 108 for return by mechanism 110 to in-feed end 106.

Extruder 102 can be placed in other orientations relative to press 114 and mold sectors 118. For example, extruder 102 could be positioned along one of the lateral sides of press 114 such that extruder 102 and/or outlet 126 are moved along lateral direction T.

The molded strip of rubber material exiting out-feed end 108 can be subjected to further steps before application to a tire carcass. For example, the molded strip of rubber material may be cooled and then rolled up for storage. Other steps may be applied as well.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An apparatus for the continuous molding and curing of a tire tread, the apparatus defining a longitudinal axis, the apparatus comprising:
   an extruder with an outlet for providing an extruded rubber material flow;
   a plurality of movable mold sectors for receipt of the extruded rubber material flow;
   a mold sector transport mechanism arranged along the longitudinal axis and configured for moving mold sectors along a process direction, the mold sector transport mechanism having an in-feed end and an out-feed end;
   one or more upper platens positioned over the mold sector transport mechanism;
   a first lower platen positioned at the in-feed end of the mold sector transport mechanism, the first lower platen movable along a vertical direction relative to the one or more upper platens;
   a second lower platen positioned adjacent and downstream of the first lower platen, the second lower platen movable along a vertical direction relative to the one or more upper platens;
   a first hydraulic motor configured for raising and lowering the first lower platen; and
   a second hydraulic motor configured for raising and lowering the second lower platen.

2. The apparatus for the continuous molding and curing of a tire tread as in claim 1, wherein the extruder outlet is movable back and forth along the longitudinal axis relative to the mold sector transport mechanism.

3. The apparatus for the continuous molding and curing of a tire tread as in claim 1, wherein the extruder outlet has a first position where the extruder outlet contacts a mold sector to provide a seal against backflow of rubber material from the mold sector and has a second position where the extruder outlet is removed from contact with the mold sector.

4. The apparatus for the continuous molding and curing of a tire tread as in claim 1, further comprising;
   an endless sheet of anti-stick material having a portion positioned between the one or more upper platens and multiple mold sectors.

5. The apparatus for the continuous molding and curing of a tire tread as in claim 1, wherein the mold sectors are interlocked with an adjacent mold sector when moved along the process direction on the mold sector transport mechanism.

6. The apparatus for the continuous molding and curing of a tire tread as in claim 1, further comprising:
   a mold sector return mechanism extending longitudinally in an adjacent and parallel manner to the mold sector transport mechanism, the mold sector return mechanism configured for transporting one or more mold sectors in a direction opposite to the process direction and back towards the in-feed end of the mold sector transport mechanism.

7. The apparatus for the continuous molding and curing of a tire tread as in claim 6, further comprising:
   a lateral transfer device for moving a mold sector from the mold sector return mechanism onto the in-feed end of the mold sector transport mechanism.

8. The apparatus for the continuous molding and curing of a tire tread as in claim 1, further comprising:
   a demolder positioned at the out-feed end of the mold sector transport mechanism and configured for removing molded rubber material from the mold sectors.

9. The apparatus for the continuous molding and curing of a tire tread as in claim 1, wherein each mold sector is attached to a mold back and is positioned between a pair of opposing rails.

* * * * *